United States Patent
Morikawa et al.

(10) Patent No.: US 11,735,758 B2
(45) Date of Patent: Aug. 22, 2023

(54) SOLID OXIDE FUEL CELL STACK

(71) Applicant: MORIMURA SOFC TECHNOLOGY CO., LTD., Komaki (JP)

(72) Inventors: Tetsuya Morikawa, Ichinomiya (JP); Nobuyuki Hotta, Konan (JP)

(73) Assignee: MORIMURA SOFC TECHNOLOGY CO., LTD., Komaki (JP)

( * ) Notice: Subject to any disclaimer, the term of this patent is extended or adjusted under 35 U.S.C. 154(b) by 23 days.

(21) Appl. No.: 17/486,052

(22) Filed: Sep. 27, 2021

(65) Prior Publication Data

US 2022/0013801 A1 Jan. 13, 2022

Related U.S. Application Data

(63) Continuation of application No. 15/512,923, filed as application No. PCT/JP2015/004362 on Aug. 28, 2015, now abandoned.

(30) Foreign Application Priority Data

Sep. 22, 2014 (JP) ................................ 2014-192936

(51) Int. Cl.
*H01M 4/90* (2006.01)
*H01M 8/12* (2016.01)
(Continued)

(52) U.S. Cl.
CPC ......... *H01M 8/248* (2013.01); *H01M 4/9033* (2013.01); *H01M 4/9066* (2013.01);
(Continued)

(58) Field of Classification Search
CPC .. H01M 8/248; H01M 4/9033; H01M 4/9066; H01M 8/02; H01M 8/12;
(Continued)

(56) References Cited

U.S. PATENT DOCUMENTS

| 3,861,959 A | 1/1975 | Cadiou |
| 5,786,105 A | 7/1998 | Matsushima et al. |
| (Continued) | | |

FOREIGN PATENT DOCUMENTS

| AU | 2001276298 B2 | 1/2002 |
| CA | 2415388 A1 | 1/2002 |
| (Continued) | | |

OTHER PUBLICATIONS

Communication dated Jan. 22, 2018, issued by the Korean Intellectual Property Office in counterpart Korean Patent Application No. 10-2017-7007554.

(Continued)

*Primary Examiner* — Christian Roldan
(74) *Attorney, Agent, or Firm* — Sughrue Mion, PLLC (57) ABSTRACT

A method of manufacturing a solid oxide fuel cell stack, including alternately disposing a plurality of single fuel cells, and a plurality of interconnectors disposed alternately and holding the alternately disposed plurality of single fuel cells and plurality of interconnectors between a pair of end members, forming a space between a first end member and a first interconnector, disposing a junction member composed of an elastic member and an electrically conductive member in the space, and urging a portion of an electrically conductive member and another portion of the electrically member against the first end member and the first interconnector so that a total thickness of the portion of the electrically conductive member, the another portion of the electrically conductive member, and the elastic member prior to being disposed in the space between the first end member and the first interconnector is greater than a height of the space.

8 Claims, 10 Drawing Sheets

(51) Int. Cl.
  *H01M 8/248* (2016.01)
  *H01M 8/02* (2016.01)
  *H01M 8/2432* (2016.01)
  *H01M 8/24* (2016.01)
  *H01M 8/1253* (2016.01)
  *H01M 8/126* (2016.01)

(52) U.S. Cl.
  CPC ............... *H01M 8/02* (2013.01); *H01M 8/12* (2013.01); *H01M 8/126* (2013.01); *H01M 8/1253* (2013.01); *H01M 8/24* (2013.01); *H01M 8/2432* (2016.02); *H01M 2008/1293* (2013.01)

(58) Field of Classification Search
  CPC ...... H01M 8/1253; H01M 8/126; H01M 8/24; H01M 8/2432; H01M 2008/1293; H01M 8/0297; H01M 8/2425; Y02E 60/50; Y02P 70/50
  USPC ........................................................ 429/465
  See application file for complete search history.

(56) References Cited

U.S. PATENT DOCUMENTS

| | | | |
|---|---|---|---|
| 2002/0142209 A1 | 10/2002 | Kikuchi et al. | |
| 2004/0241540 A1* | 12/2004 | Tsutsumi | H01M 50/46 429/157 |
| 2010/0108537 A1* | 5/2010 | Perego | C25B 9/65 204/280 |
| 2012/0034541 A1* | 2/2012 | Muraoka | H01M 8/1011 429/456 |
| 2014/0170522 A1 | 6/2014 | Hotta et al. | |
| 2014/0212784 A1* | 7/2014 | Okuyama | H01M 8/0247 429/465 |
| 2015/0056537 A1* | 2/2015 | Yagi | H01M 8/006 429/495 |
| 2015/0372318 A1* | 12/2015 | Miyabata | H01M 8/0247 429/535 |
| 2015/0372334 A1 | 12/2015 | Yagi et al. | |

FOREIGN PATENT DOCUMENTS

| | | |
|---|---|---|
| CA | 2724867 A1 | 4/2010 |
| CA | 2843676 A1 | 2/2013 |
| EP | 1314217 B1 | 5/2010 |
| EP | 2 744 026 A1 | 6/2014 |
| EP | 2 955 777 A1 | 12/2015 |
| JP | 2002-298901 A | 10/2002 |
| JP | 2011-222161 A | 11/2011 |
| JP | 2012-28092 A | 2/2012 |
| JP | 2013-55042 A | 3/2013 |
| JP | 5346402 B1 | 11/2013 |
| WO | 2010/038869 A1 | 4/2010 |
| WO | 2014/123150 A1 | 8/2014 |

OTHER PUBLICATIONS

Office Action dated Nov. 1, 2018, by the State Intellectual Property Office of People's Republic of China in counterpart Application No. 201580050676.4.
Communication dated Jul. 3, 2018, issued by the Canadian Intellectual Property Office in counterpart Canadian Patent Application No. 2962229.
International Search Report dated Dec. 1, 2015 issued by the International Searching Authority in counterpart International Application No. PCT/JP2015/004362 (PCT/ISA/210).
Written Opinion dated Dec. 1, 2015 issued by the International Searching Authority in counterpart International Application No. PCT/JP2015/004362 (PCT/ISA/237).
Search Report dated Feb. 23, 2018 by the European Patent Office in counterpart European Patent Application No. 15844142.8.

\* cited by examiner

FIRST COMPARATIVE EXAMPLE

SOLID OXIDE FUEL CELL STACK

CROSS-REFERENCE TO RELATED APPLICATIONS

This application is a Rule 53(b) Continuation of U.S. application Ser. No. 15/512,923 filed Mar. 21, 2017, which is a National Stage of International Application No. PCT/JP2015/004362 filed Aug. 28, 2015, claiming priority based on Japanese Patent Application No. 2014-192936 filed Sep. 22, 2014, the disclosures of which are incorporated herein by reference in their respective entireties.

TECHNICAL FIELD

The present invention relates to a solid oxide fuel cell stack having a structure in which single fuel cells and interconnectors are disposed alternately and held between a pair of end members from a direction in which the single fuel cells face one another.

BACKGROUND ART

Conventionally known is a solid oxide fuel cell (SOFC) which uses a single fuel cell having an anode layer, a cathode layer, and a solid electrolyte layer. A solid oxide fuel cell stack (hereinafter, called "fuel cell stack") is configured such that the single fuel cells and the interconnectors are disposed alternately and fixedly held between a pair of end plates (end members) from a direction in which the single fuel cells face one another. Generally, the end plate is a metal member having the form of a flat plate, and the flat surface of the end plate is joined to the interconnector. Since the interconnector is electrically connected to the single fuel cell through a current collector, a current path is formed from the single fuel cell to the end plate.

During operation of the fuel cell stack, due to differences in thermal expansion coefficient and pressure among component members, the single fuel cell may deform. The interconnector and the end plate may fail to follow the deformation of the single fuel cell, potentially resulting in damage to reliability of electrical connection. Various measures have been proposed for ensuring such reliability of electrical connection in the fuel cell stack. For example, Patent Document 1 discloses a structure in which a laminate to follow deformation of the single fuel cell is accommodated in a cavity formed in the end plate (external holding member). Also, for example, Patent Document 2 discloses the following structure: a case is attached to the outside of an end plate, and disk springs having elastic force are inserted between the case and the end plate and are compressed or expanded according to the amount of thermal expansion.

PRIOR ART DOCUMENTS

Patent Documents

Patent Document 1: International Publication No. WO2010/038869
Patent Document 2: Japanese Patent Application Laid-Open (kokai) No. 2002-298901

SUMMARY OF THE INVENTION

Problem to be Solved by the Invention

However, during operation of the fuel cell stack at high temperature, the amount of deformation of the single fuel cell becomes considerably large, and the measures disclosed in Patent Document 1 to cope with differences in thermal expansion coefficient and pressure encounter difficulty in following a large deformation of the single fuel cell. Further, due to existence of electrically nonconductive portions between the end plate and the interconnector, a problem of increase in electric resistance arises as a result of the current path becoming excessively narrow. Also, even though the structure disclosed in Patent Document 2 is employed, the end plate having high rigidity encounters difficulty in following a large deformation of the single fuel cell. Thus, according to the conventional structures disclosed in Patent Documents 1 and 2, since electrical contact deteriorates as a result of failure to follow deformation of the single fuel cell, electric resistance of the current path extending from the single fuel cell to the end plate increases, potentially resulting in deterioration in electricity generation performance.

The present invention has been conceived to solve the above problem, and an object of the invention is to provide a fuel cell stack capable of ensuring the performance of following deformation of a single fuel cell by means of a junction structure between an end plate and an interconnector, and restraining an increase in resistance of a current path extending from the single fuel cell to the end plate.

Means for Solving the Problem

In order to solve the above problem, a solid oxide fuel cell stack of the present invention has a structure in which a plurality of single fuel cells, each having an anode layer, a cathode layer, and a solid electrolyte layer, and a plurality of interconnectors are disposed alternately and held between a pair of end members in a direction in which the single fuel cells face one another, and the solid oxide fuel cell stack is characterized in that a space is formed between at least one of the pair of end members, which is a first end member, and a first interconnector; a junction member composed of an elastic member and an electrically conductive member is disposed in the space; with respect to the direction in which the single fuel cells face one another, a portion of the electrically conductive member is disposed between the first end member and the elastic member, and another portion of the electrically conductive member is disposed between the first interconnector and the elastic member; and the first end member and the first interconnector are electrically connected through the electrically conductive member.

According to the fuel cell stack of the present invention, the junction member composed of the elastic member and the electrically conductive member is disposed in the space between the adjacent first end member and first interconnector, and the first end member and the first interconnector are electrically connected through the electrically conductive member. By virtue of employment of such a structure, elastic force of the elastic member ensures the performance of following deformation of the single fuel cell during high-temperature operation, and, since the electrically conductive member partially constitutes a current path, there can be prevented a rise in electric resistance which could otherwise result from contact between the first end member and the first interconnector. Also, even in the case of use of spring members formed of a metal material, since the elastic member, which is free of creep at high temperature, is combined with the electrically conductive member, there can be prevented deterioration in elastic force which could otherwise result from creep.

In the present invention, a unit structure of the junction member can include a bent plate portion of the electrically conductive member. In this case, the bent plate portion of the electrically conductive member of the unit structure can be formed into various shapes. For example, the unit structure may include the electrically conductive member configured such that one end of the plate portion is disposed between the first end member and the elastic member, while the other end of the plate portion is disposed between the first interconnector and the elastic member. Alternatively, the unit structure may include the electrically conductive member configured such that one end of the plate portion is disposed between the first end member and the elastic member, while the other end of the plate portion is disposed between the first interconnector and another elastic member disposed in the space.

In the present invention, various selections are available for materials of the elastic member and the electrically conductive member. Typically, the elastic member can be formed of an electrically insulative material, and the electrically conductive member can be formed of a metal material. Preferably, the elastic member is formed of, for example, mica, which is unlikely to creep at high temperature. This easily ensures the performance of the interconnector following deformation of the single fuel cell. Preferably, the electrically conductive member is formed primarily of nickel, for example. This can reduce an increase in electric resistance between the end member and the interconnector. Also, in the present invention, the space may be filled with reducing gas. This can restrain an increase in electric resistance which could otherwise result from oxidation of the electrically conductive member.

In the present invention, the solid oxide fuel cell stack may be such that a second interconnector is disposed in opposition to the first interconnector with the single fuel cell intervening therebetween and such that a second space is formed between the single fuel cell and the second interconnector, and a current collector is disposed in the second space, the current collector being composed of a second elastic member and a second electrically conductive member and formed such that a portion of the second electrically conductive member is disposed between the single fuel cell and the second elastic member, while another portion of the second electrically conductive member is disposed between the second interconnector and the second elastic member. This allows use of a common structure for the junction member between the first end member and the first interconnector, and the current collector between the single fuel cell and the second interconnector, whereby the cost of manufacturing the fuel cell stack can be reduced.

Effects of the Invention

As mentioned above, according to the present invention, even in the case of use of an end member having high rigidity, there can be implemented a fuel cell stack capable of sufficiently following deformation of a single fuel cell during high-temperature operation, favorably maintaining good electrical contact between an end member and an interconnector while restraining influence of creep of a metal member at high temperature, and restraining deterioration in electricity generation performance resulting from an increase in electric resistance, by means of disposition of an electrically conductive member between the end member and the interconnector.

MODES FOR CARRYING OUT THE INVENTION

A preferred embodiment of the present invention will next be described with reference to the drawings. However, the embodiment to be described below is a mere example of application of the present invention to a solid oxide fuel cell stack. The contents of the embodiment should not be construed as limiting the invention.

Figure 1:
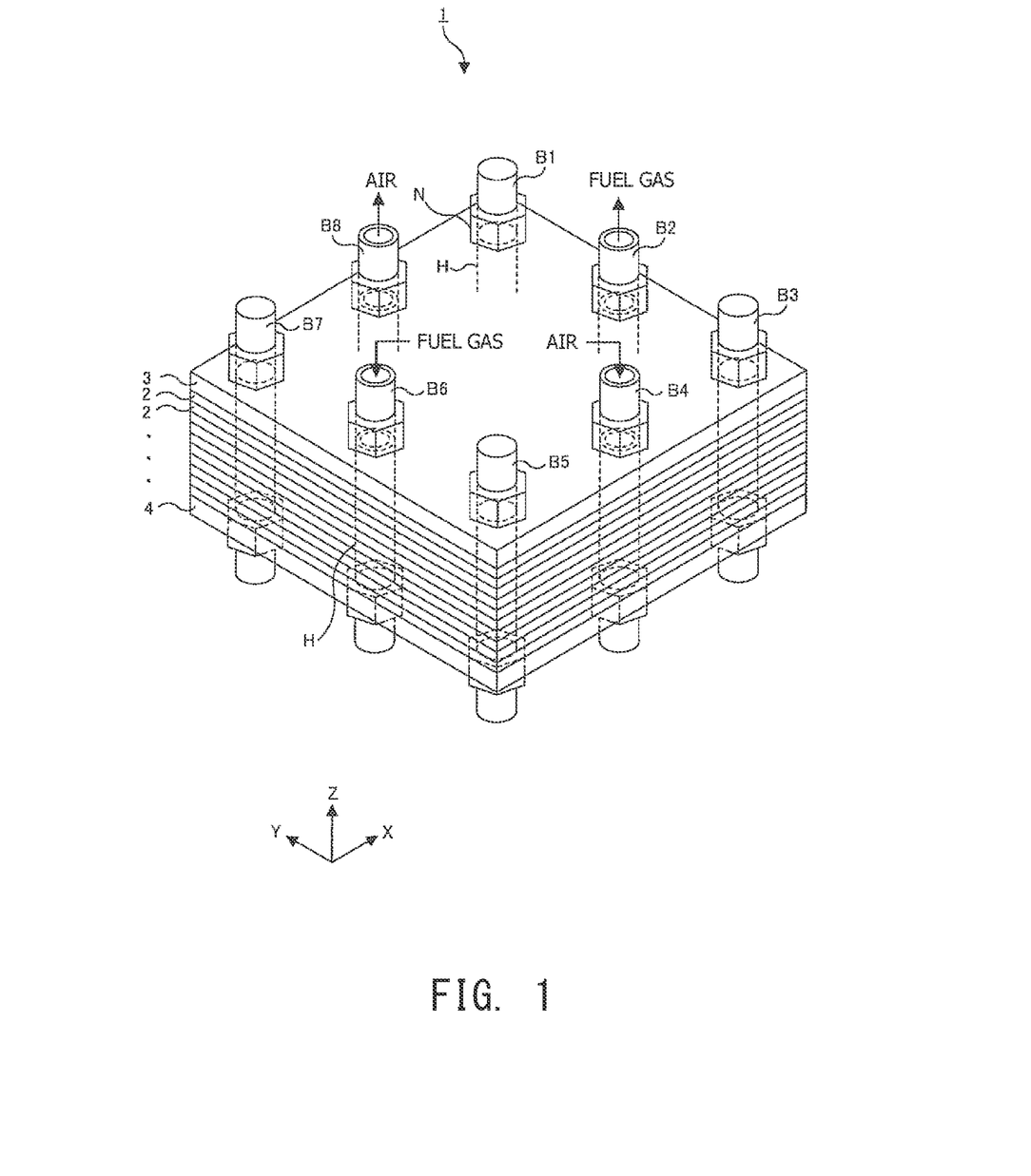
FIG. 1 Perspective view of a solid oxide fuel cell stack 1 according to an embodiment of the present invention.

FIG. 1 is a perspective view of a solid oxide fuel cell stack (hereinafter, called a "fuel cell stack") 1 according to the present embodiment. The fuel cell stack 1 of the present embodiment includes a plurality of (e.g., 20) electricity generation units 2. The electricity generation unit 2 includes a pair of interconnectors 5(1) and 5(2), a single fuel cell (hereinafter, may be called merely "single cell") C(1), a cathode-side current collector 10, a cathode-side insulation frame 11, a separator 12, an anode-side frame 13, an anode side insulation frame 14, and an anode-side current collector 15 (see FIG. 2). The electricity generation unit 2 will be described in detail later. No particular limitation is imposed on the number of the electricity generation units 2 contained in the fuel cell stack 1, but the number is determined as appropriate according to output voltage and output current of the fuel cell stack 1 according to the present embodiment. For convenience of description, the description of the present embodiment mentions directions such as "upper" and "lower" on the basis of the directions in the drawings, but should not be construed as limiting the actual orientation of the fuel cell stack 1.

As shown in FIG. 1, the fuel cell stack 1 is configured such that a plurality of the electricity generation units 2 are unitarily fixed by means of a plurality of bolts B1 to B8 and a plurality of nuts N. In the fuel cell stack 1, through holes H are formed at positions corresponding to the plurality of bolts B1 to B8, and the above-mentioned plurality of electricity generation units 2 are fixedly held between upper and lower end plates 3 and 4. The four bolts B1, B3, B5, and B7 located at four corners in the square plane of FIG. 1 are used merely as connection members for fixing the plurality of electricity generation units 2 which partially constitute the fuel cell stack 1. By contrast, the other four bolts B2, B4, B6, and B8 function as portions (inlets or outlets) of flow channels of fuel gas or air (oxidizer gas) in addition to as the above connection members. For convenience of description, FIG. 1 illustrates mutually orthogonal X-axis, Y-axis, and Z-axis.

Figure 2:
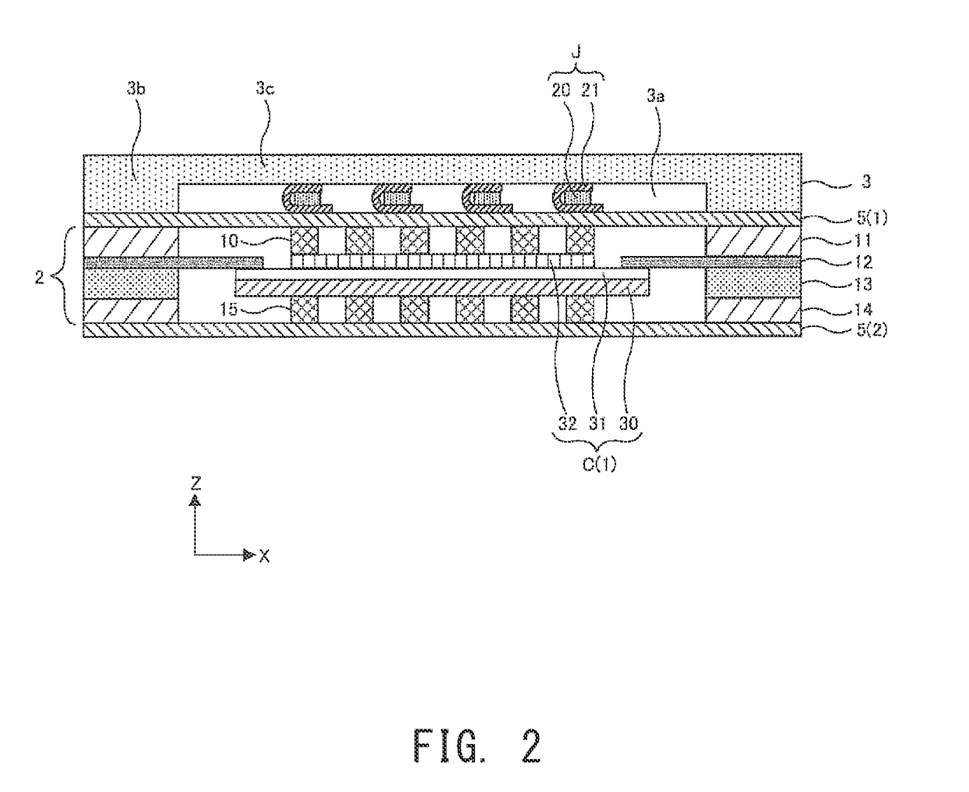
FIG. 2 Sectional view for explaining a basic structure which implements features of the present invention, in the fuel cell stack 1 of the present embodiment.

Next, FIG. 2 is a sectional view for explaining a basic structure which implements features of the present invention, in the fuel cell stack 1 of the present embodiment, showing a sectional structure ranging from the upper end plate 3 to the second interconnector 5(2). For convenience of description, FIG. 2 shows the horizontal X-axis and the vertical Z-axis. Notably, FIG. 2 eliminates the illustration of flow channel structures of FIG. 1. The basic structure shown in FIG. 2 includes the upper end plate 3, the upper and lower interconnectors 5(1) and 5(2), a junction member J composed of an elastic member 20 and an electrically conductive member 21, the top single cell C(1) among the plurality of single cells contained in the fuel cell stack 1, the cathode-side current collector 10, the cathode-side insulation frame 11, the separator 12, the anode-side frame 13, the insulation frame 14, and the anode-side current collector 15.

In FIG. 2, the end plate 3 (the first end member of the present invention) is a plate-like metal member having a cavity having a quadrangular shape in plan view and formed in a lower central region of the metal member. That is, the end plate 3 is formed such that an outer peripheral portion 3b is greater in thickness than a central portion 3c. The interconnector 5(1) having the form of a flat plate is disposed under the end plate 3. Thus, as a result of the interconnector 5(1) closing the lower side of the cavity of the end plate 3, a space 3a is formed. The interconnector 5(1) (the first interconnector of the present invention) is a metal member having the form of a flat plate and adapted to establish electrical connection between the end plate 3 and the single cell C(1). The other interconnectors 5(1) and 5(2) have the same structure as that of the interconnector 5(1) of FIG. 2. The end plate 3 and the interconnectors 5(1) and 5(2) are formed of electrically conductive metal materials, respectively.

Unit structures of the junction member J composed of the elastic member 20 and the electrically conductive member 21 are disposed at predetermined intervals in the space 3a between the end plate 3 and the interconnector 5(1). To facilitate understanding, FIG. 2 shows an example of disposition of four unit structures of the junction member J; however, no particular limitation is imposed on the number of disposed unit structures of the junction member J. The junction member J has a structure in which the electrically conductive member 21 holds the elastic member 20 from above and underneath, and the electrically conductive member 21 is fixed in contact with the end plate 3 and the interconnector 5(1). The elastic member 20 functions as a spacer between the upper end and the lower end of the electrically conductive member 21 and has a role of enhancing the performance of following deformation of the single cell C(1). The electrically conductive member 21 is a plate-like metal member which is bent so as to have a U-shaped cross section and has a role of establishing an electrical connection between the end plate 3 and the interconnector 5(1). The more specific structures, action, and effects of the elastic member 20 and the electrically conductive member 21 will be described later.

The elastic member 20 is formed of an electrically insulative material having elastic force such as mica. The electrically conductive member 21 is formed primarily of a metal material having high electrical conductivity such as nickel (Ni). Preferably, the space 3a is filled with reducing gas such as hydrogen. This is for the following reason: since the formation of an oxide film on the surface of the electrically conductive member 21 causes an increase in resistance, oxidation of the electrically conductive member 21 is prevented by means of reducing gas. Alternatively, oxidation of the electrically conductive member 21 may be prevented through surface treatment on the electrically conductive member 21 by use of stainless steel or the like.

Dimensions of the space 3a and the junction member J are, for example, as follows: with a height in the Z-axis direction of the space 3a of about 1 mm, the thickness of the elastic member 20 is 0.5 mm, and the thickness of each of plate portions at opposite ends of the electrically conductive member 21 of the unit structure is 0.25 mm (0.5 mm in total). In this case, by means of the elastic member 20 and the electrically conductive member 21 having a total height of slightly greater than 1 mm as measured before disposition of the junction member J in the space 3a, the plate portions at opposite ends of the electrically conductive member 21 can be sufficiently urged against the end plate 3 and the interconnector 5(1).

The single cell C(1) is configured such that an anode layer 30, a solid electrolyte layer 31, and a cathode layer 32 are laminated in the ascending order. The anode layer 30 comes into contact with fuel gas serving as a hydrogen source and functions as an anode of the single cell C(1). A metal such as Ni, cermet of Ni and ceramic particles, and an Ni-based alloy or the like may be used as the material of the anode layer 30. The solid electrolyte layer 31 is of one of various ion-conductive solid electrolytes. Examples of material for the solid electrolyte layer 31 include YSZ (yttria-stabilized zirconia), ScSZ (scandia-stabilized zirconia), SDC (samaria-doped ceria), GDC (gadolinium-doped ceria), and perovskite-type oxides. The cathode layer 32 comes into contact with oxidizer gas (air) serving as an oxygen source and functions as a cathode of the single cell C(1). Examples of material for the cathode layer 32 include perovskite-type oxides such as LSCF (lanthanum strontium cobalt ferrite) and LSM (lanthanum strontium manganese oxide), noble metals, and cermet of a noble metal and ceramic.

As shown in FIG. 2, the cathode layer 32 of the single cell C(1) is electrically connected to the upper interconnector 5(1) through the cathode-side current collector 10, and the anode layer 30 of the single cell C(1) is electrically connected to the lower interconnector 5(2) (the second interconnector of the present invention) through the anode-side current collector 15. Examples of material for the cathode-side current collector 10 include metal materials such as Ag—Pd, and examples of material for the anode-side current collector 15 include materials having air permeability such as Ni felt. The cathode-side current collector 10 may be formed integrally with the interconnectors 5(1) and 5(2)

such that the cathode-side current collector 10 protrude from the interconnectors 5(1) and 5(2).

In an outer peripheral region between the upper and lower interconnectors 5(1) and 5(2), the cathode-side insulation frame 11, the separator 12, the anode-side frame 13, and the insulation frame 14 are disposed in the descending order. The separator 12 having a role of separating gas flow channels is a flexible thin plate of metal, and a region around an opening formed at the center of the separator 12 is joined to the upper surface of an outer peripheral portion of the solid electrolyte layer 31. The cathode-side insulation frame 11 is disposed in such a manner as to surround the cathode-side current collector 10; the anode-side frame 13 is disposed in such a manner as to surround the anode layer 30 and the solid electrolyte layer 31; and the insulation frame 14 is disposed in such a manner as to surround the anode-side current collector 15.

Although unillustrated in FIG. 2, regarding the single cells and the interconnectors 5(1) and 5(2) disposed under the interconnector 5(2), a structure similar to that of FIG. 2 is repeatedly disposed. However, the lower end plate 4 may have a structure similar to that of the upper end plate 3, but may have such a structure as to be in direct contact with the anode-side current collector 15 or the anode layer 30 located above; in this case, a metal member having the form of a mere flat plate may be used as the lower end plate 4. That is, the structure of the present invention can be applied to at least one end portion in the Z-axis direction of the fuel cell stack 1.

Figure 3:
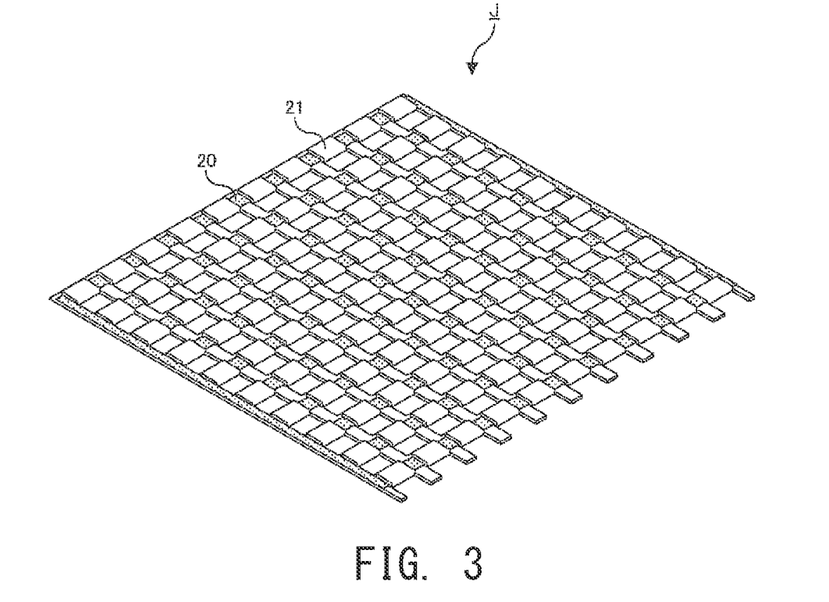
FIG. 3 Perspective view showing a specific example of the structure of a junction member J of FIG. 2.
Figure 4:
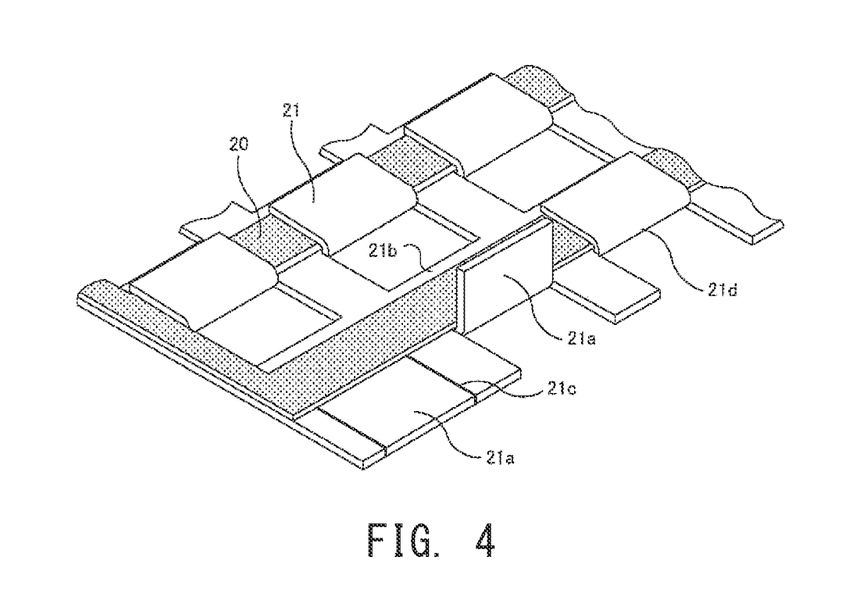
FIG. 4 Fragmentary enlarged view for explaining a partial structure of a corner portion of FIG. 3.

A specific example of the structure of the junction member J of FIG. 2 will next be described with reference to FIGS. 3 and 4. FIG. 3 is a perspective view showing a specific example of the structure of the junction member J of FIG. 2, and FIG. 4 is a fragmentary enlarged view for explaining a partial structure of a corner portion of FIG. 3. The elastic member 20 and the electrically conductive member 21 which constitute the junction member J each have the form of a flat plate in whole and are disposed in an overlapping manner in plan view. FIG. 3 shows an example in which 100 (10×10) unit structures of the junction member J are formed at equal intervals. As shown in FIG. 4, at the initial stage, slits 21c are formed on opposite sides of upper end portions 21a of the electrically conductive member 21; then, through bending at bend portions 21d so as to have a shape resembling the letter U, the elastic member 20 is held from above and underneath between the upper end portions 21a and lower end portions 21b.

An electrically insulative material used to form the elastic member 20 can be, in addition to mica as mentioned above, any one or a combination of alumina felt, vermiculite, carbon fiber, silicon carbide fiber, and silica. Preferably, a laminate structure having the form of a thin plate such as mica is imparted to these electrically insulative materials. This is because such a structure can impart appropriate elasticity to the elastic member 20 against load applied in the direction of lamination to the elastic member 20.

The example of FIGS. 3 and 4 shows the junction member J configured to unite a single elastic member 20 and a single electrically conductive member 21; however, a plurality of the elastic members 20 and a plurality of the electrically conductive members 21 may be integrally combined to configure the junction member J.

Figure 5:
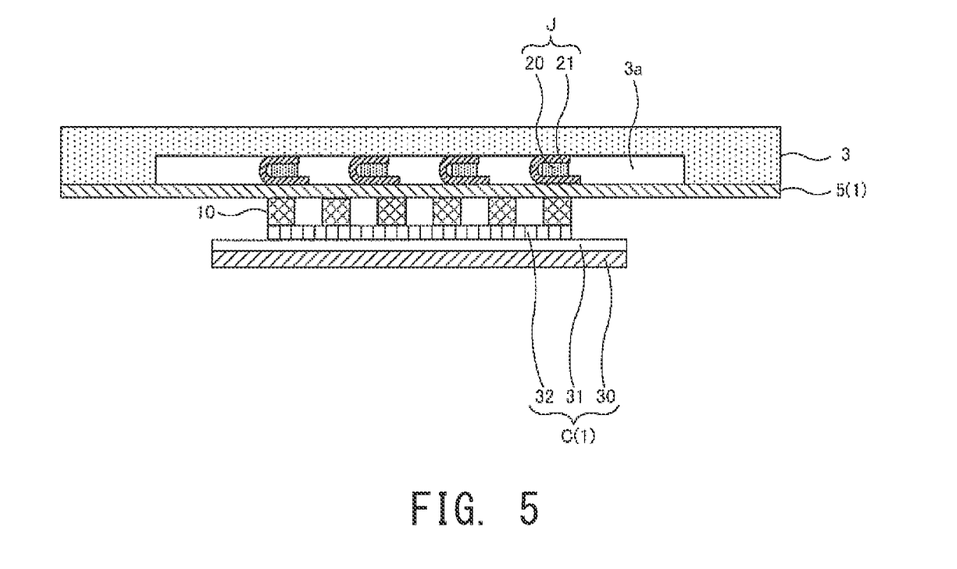
FIG. 5 View showing a structure which includes an end plate 3, the junction member J, an interconnector 5(1), an anode-side current collector 10, and a single cell C(1) of FIG. 2, for explaining a junction structure of the present invention.
Figure 6:
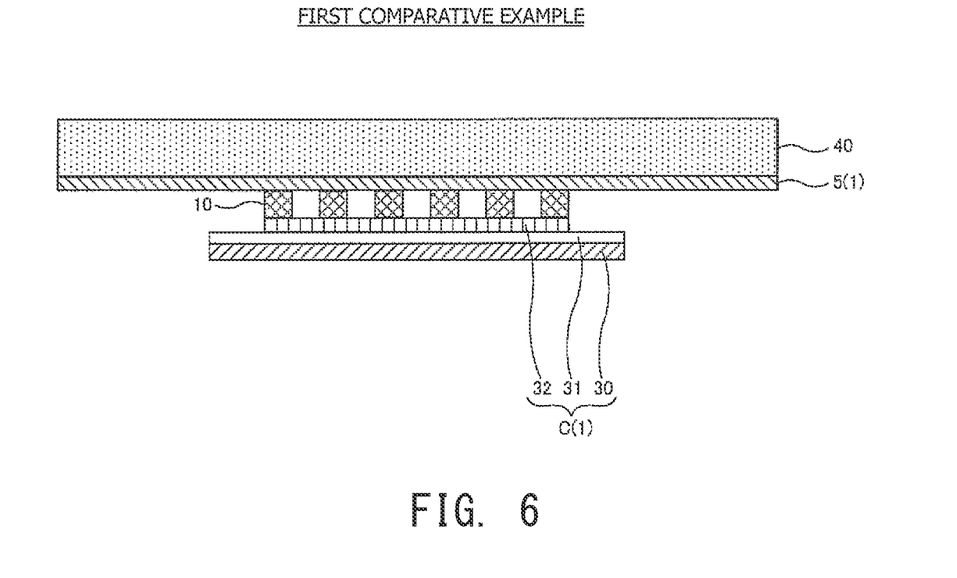
FIG. 6 View showing a first comparative example for contrast with the junction structure of the present invention.
Figure 7:
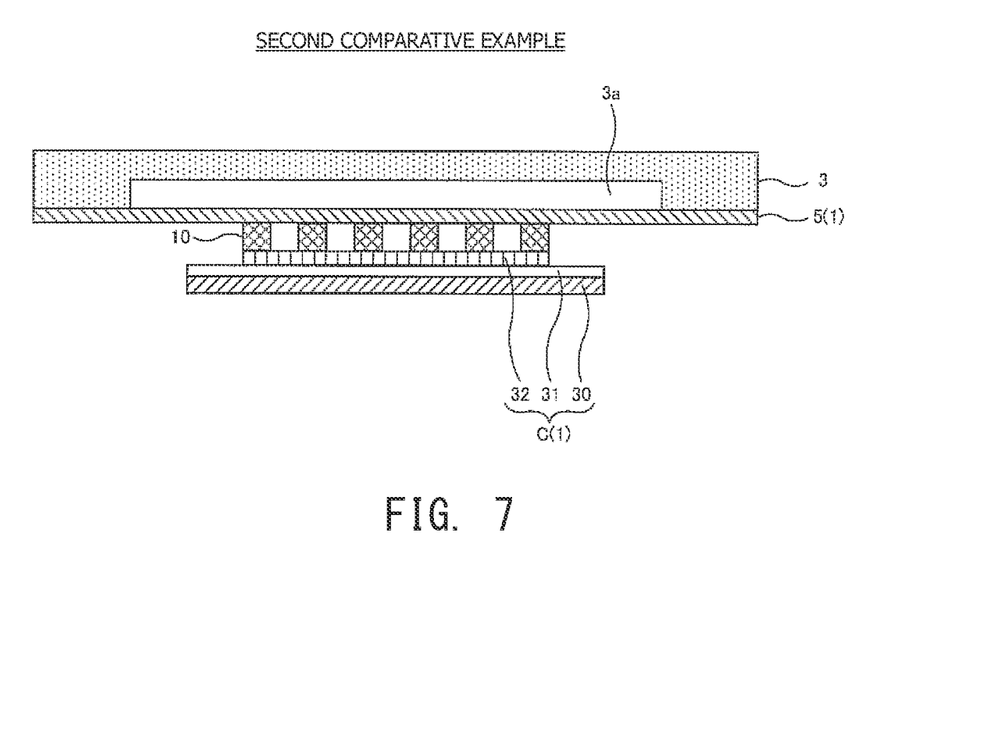
FIG. 7 View showing a second comparative example for contrast with the junction structure of the present invention.
Figure 8:
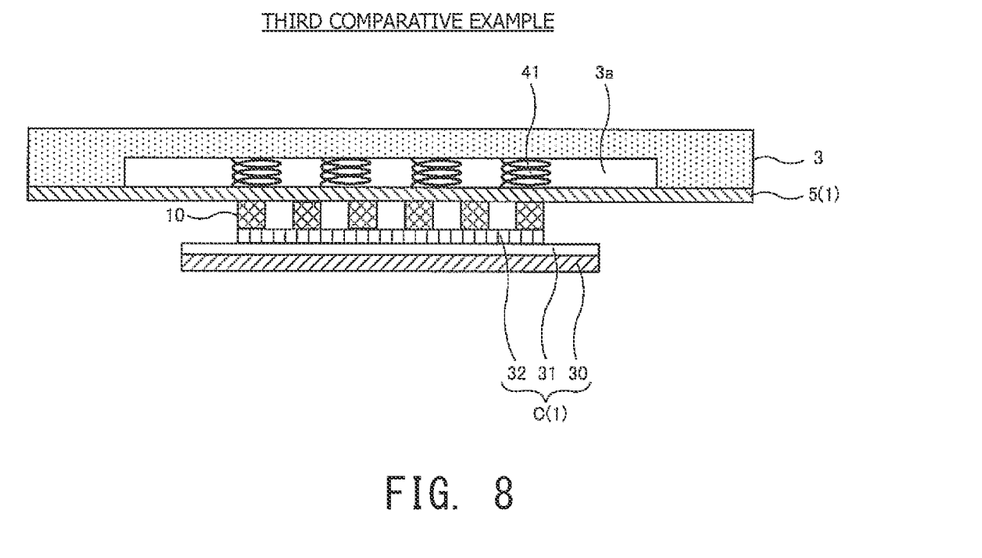
FIG. 8 View showing a third comparative example for contrast with the junction structure of the present invention.

Next, a characteristic junction structure between the end plate 3, the junction member J, and the interconnector 5(1) of FIG. 2 and the action and effects of the junction structure will be described specifically. FIG. 5 is a view showing a structure which includes the end plate 3, the junction member J, the interconnector 5(1), the cathode-side current collector 10, and the single cell C(1) of FIG. 2, for explaining the junction structure of the present invention. FIGS. 6 to 8 show structures of comparative examples corresponding to the structure of FIG. 5 for contrast with the junction structure of the present invention.

First, the first comparative example shown in FIG. 6 has a structure which uses an end plate 40 having the form of a flat plate different from the end plate 3 of FIG. 5. The first comparative example is simple in the structure of the end plate 40; however, the space 3a is not formed between the end plate 40 and the interconnector 5(1), so that the junction member J cannot be disposed. As shown in FIG. 6, the end plate 40 and the interconnector 5(1) are electrically connected in a condition of close contact with each other. Also, an appropriate contact load is imposed on the single cell C(1) as a result of the bolts B1 to B8 (FIG. 1) being tightened at an initial assembling stage of the fuel cell stack 1. However, according to the first comparative example, because of high rigidity of the end plate 40, a local load is imposed on the single cell C(1), potentially resulting in breakage of the single cell C(1). Further, when the single cell C(1) which generates electricity at high temperature is deformed, the interconnector 5(1) in close contact with the end plate 40 fails to follow deformation of the single cell C(1). As a result, contact between the interconnector 5(1) and the single cell C(1) through the cathode-side current collector 10 deteriorates in the course of generation of electricity, potentially resulting in an increase in electric resistance in the region.

Next, a second comparative example shown in FIG. 7 has a structure in which, while the end plate 3 having a structure similar to that of FIG. 5 is used, the junction member J of FIG. 5 is not disposed in the space 3a. In contrast to the first comparative example, since the second comparative example employs the space 3a in a region in opposition to the single cell C(1), the interconnector 5(1) does not come into close contact with the end plate 3 having high rigidity; thus, the performance of following deformation of the single cell C(1) is improved. However, according to the second comparative example, the area of close contact between the end plate 3 and the interconnector 5(1) reduces, so that an appropriate contact pressure cannot be secured at the initial stage of assembly, potentially resulting in an increase in contact resistance during electricity generating operation. Also, as shown in FIG. 7, since, during electricity generating operation, current flowing from the single cell C(1) flows horizontally in the interconnector 5(1) which is thin and has relatively high resistance, a voltage drop may become large in the interconnector 5(1).

Next, a third comparative example shown in FIG. 8 has a structure in which spring members 41 formed of a metal material are disposed in the space 3a. As shown in FIG. 8, the spring members 41 are disposed in such a manner that elastic force thereof urges them against the end plate 3 located above and against the interconnector 5(1) located underneath, thereby electrically connecting the end plate 3 and the interconnector 5(1). Thus, according to the third comparative example, through use of the spring members 41 having low resistance, there can be provided effective means for restraining the problems of contact resistance and voltage drop involved in the second comparative example. However, the third comparative example involves the following problem: a metal material used to form the spring members 41 creeps at high temperature; thus, deformation of the spring members 41 increases with time, resulting in difficulty in stably maintaining elastic force of the spring members 41 over a long period of time.

Notably, the spring members 41 in the third comparative example can be formed by use of an electrically insulative material in place of a metal member, and this solves the above-mentioned problem caused by creep. In this case, although elastic force of the spring members 41 restrain an increase in contact resistance involved in the second comparative example, the problem of voltage drop resulting from current flowing horizontally in the interconnector 5(1) still remains unsolved.

By contrast, the employment of the structure of FIG. 2 of the present embodiment can solve the above problems involved in the employment of the first to third comparative example. The structure of the present invention can prevent deterioration in the performance of following the single cell C(1) which the first comparative example encounters, and can restrain an increase in contact resistance which the second comparative example encounters as a result of a failure to secure an appropriate contact pressure at the initial stage of assembly. Also, since the junction member J composed of the elastic member 20 and the electrically conductive member 21 is disposed in the space 3a, there does not arise a problem of voltage drop of the interconnector 5(1) which the second comparative example encounters as a result of horizontal flowing of current; and since the elastic member 20 is formed of a material, such as mica, which is free of a problem of creep involved in the third comparative example, elastic force of the elastic member 20 can be maintained over a long period of time. Further, cracking of the single cells C(1) can be prevented by means of flattening stresses whose generation is caused by irregularities and radii of curvature of the single cells C(1) in the course of assembly of the fuel cell stack 1.

Figure 9:
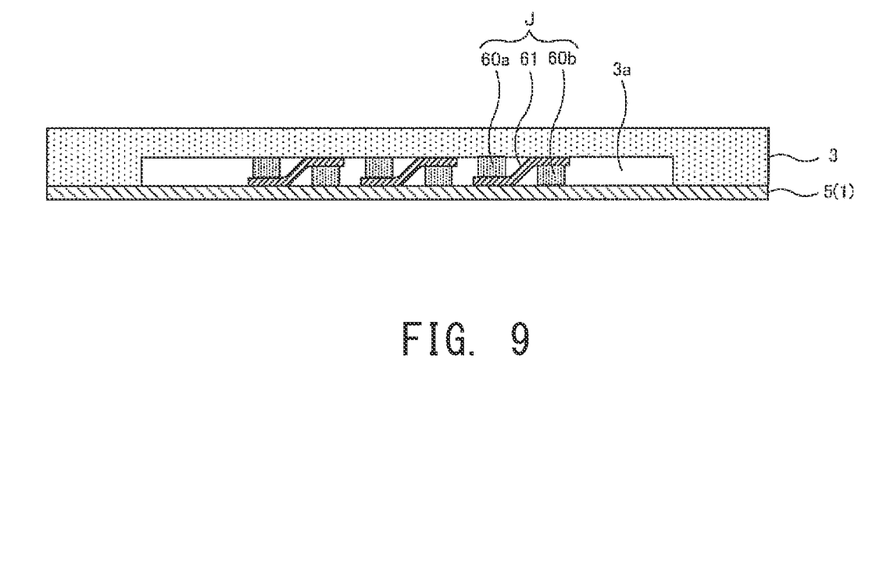
FIG. 9 View showing a modified structure of the junction member J composed of elastic members 60a and 60b and an electrically conductive member 61.
Figure 10:
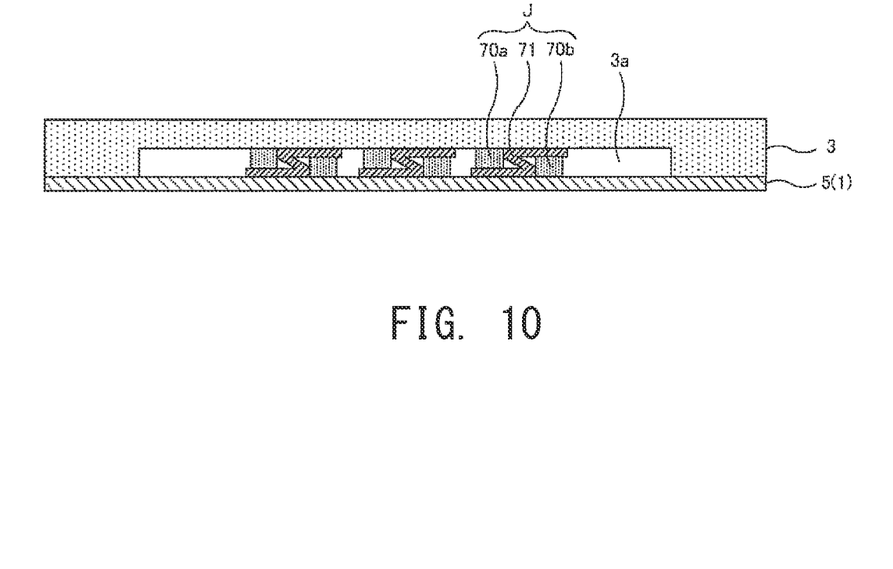
FIG. 10 View showing a modified structure of the junction member J composed of elastic members 70a and 70b and an electrically conductive member 71 and being different from FIG. 9 in the direction of juncture of the electrically conductive member 71.
Figure 11:
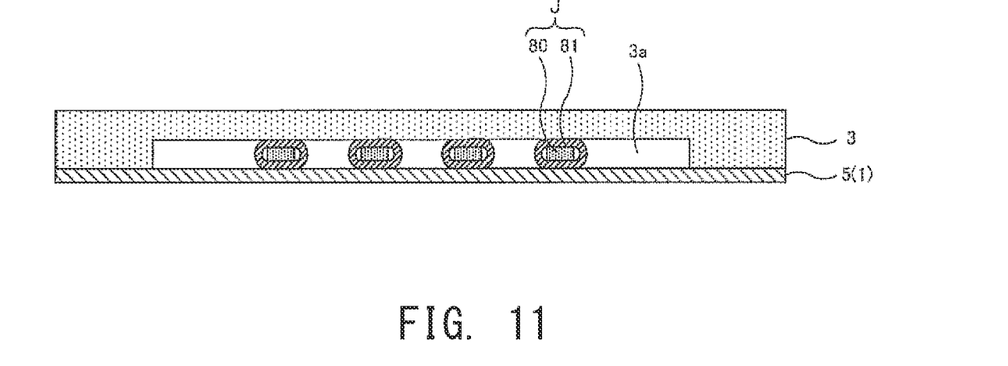
FIG. 11 View showing a modified structure of the junction member J composed of an elastic member 80 and an electrically conductive member 81 and formed such that the electrically conductive member 81 encloses the elastic member 80.

The embodiment of the fuel cell stack 1 to which the present invention is applied has been described with reference to FIGS. 1 to 8; however, the present invention is not limited to the embodiment, but can be applied to various modifications. FIGS. 9 to 11 show modified structures of the junction member J of FIG. 2. First, the modified junction member J (unit structure) of FIG. 9 is composed of elastic members 60a and 60b and the electrically conductive member 61 and has the following sectional shape: one elastic member 60a is disposed between the end plate 3 and a lower end portion of the electrically conductive member 61; the other elastic member 60b is disposed between an upper end portion of the electrically conductive member 61 and the interconnector 5(1); and the upper end portion and the lower end portion of the electrically conductive member 61 are obliquely connected. The elastic members 60a and 60b may have either an integrated structure or a separated structure so long as the unit structure has the sectional shape of FIG. 9. The modified junction member J (unit structure) of FIG. 10 is composed of the elastic members 70a and 70b and the electrically conductive member 71 similar in structure to the counterparts in FIG. 9; however, the connecting direction between the upper end portion and the lower end portion of the electrically conductive member 71 differs from that of FIG. 9.

The modified junction member J (unit structure) of FIG. 11 is composed of an elastic member 80 and an electrically conductive member 81, and the unit structure has a sectional shape such that the electrically conductive member 81 encloses the elastic member 80. That is, the sectional shape is such that opposite side surfaces of the electrically conductive member of FIG. 2 are connected. As mentioned above, various structures are available for the junction member J; i.e., in addition to the modifications shown in FIGS. 9 to 11, many other modifications can be applied.

Figure 12:
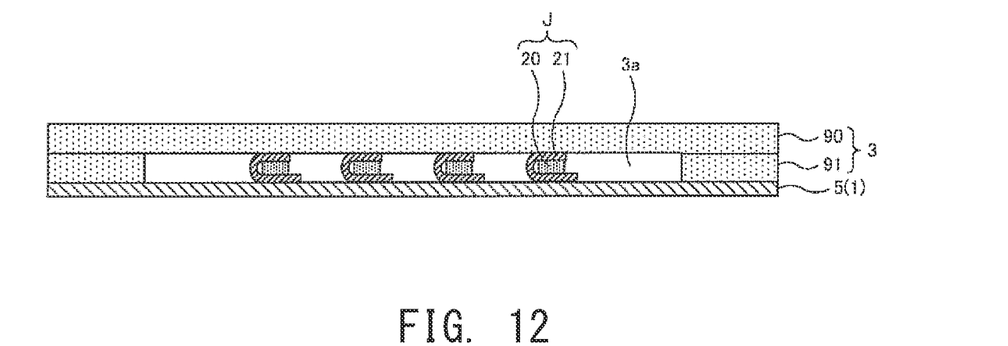
FIG. 12 View showing a modified structure of the end plate 3.

Meanwhile, FIG. 12 shows a modified structure of the end plate 3 of FIG. 2. The modified end plate 3 of FIG. 12 has a structure in which a plate member 90 having the form of a flat plate, and a frame member 91 having a central opening are joined together. Specifically, the opening of the frame member 91 forms the space 3a in a condition in which the frame member 91 is held between the plate member 90 and the interconnector 5(1), and the junction member J similar to that of FIG. 2 is disposed in the space 3a. Since the plate member 90 and the frame member 91 are simple in structure as compared with the end plate 3 of FIG. 2, working is easy. In this manner, the end plate 3 of the present embodiment is not limited to a single member, but may be formed by use of a plurality of members.

Figure 13:
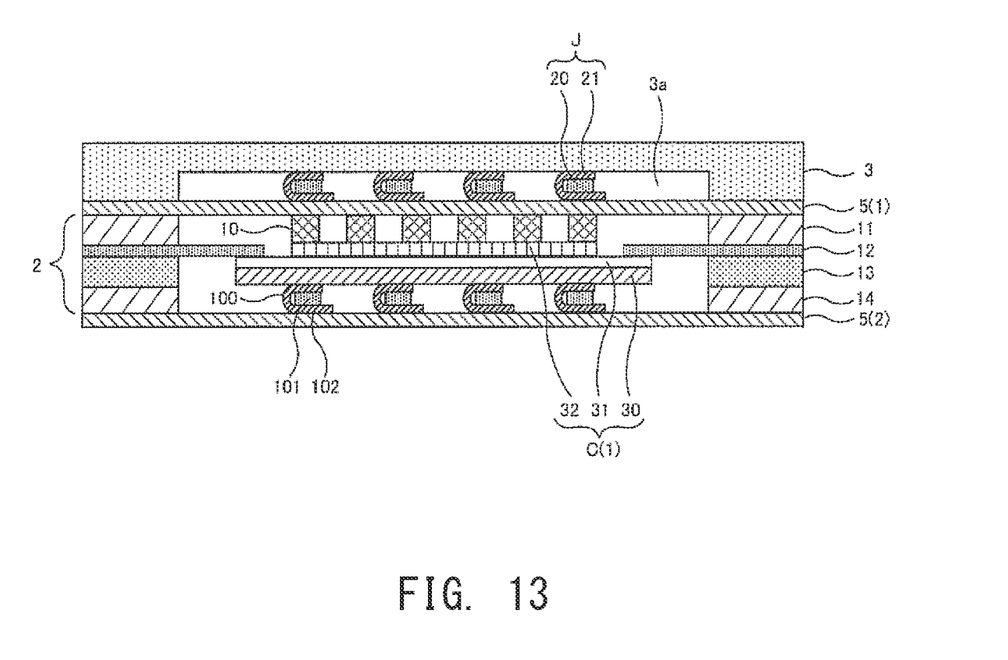
FIG. 13 View showing a modified basic structure of FIG. 2 in the fuel cell stack 1 of the present embodiment.

FIG. 13 shows a modified basic structure of FIG. 2 in the fuel cell stack 1 of the present embodiment. In FIG. 13, the anode-side current collector 15 of FIG. 2 is replaced with an anode-side current collector 100 having the same structure as that of the junction member J. Specifically, the anode-side current collector 100 which electrically connects the single cell C(1) and the lower interconnector 5(2) has a structure in which an electrically conductive member 102 holds an elastic member 101 from above and underneath. In the example of FIG. 13, the shapes and materials of the elastic member 101 and the electrically conductive member 102 which constitute the anode-side current collector 100 are the same as those of the elastic member 20 and the electrically conductive member 21 which constitute the junction member J. Thus, in manufacture of the fuel cell stack 1, the junction member J and the anode-side current collector 100 can be used as common members, the cost of manufacture can be reduced. Also, since the junction member J and the anode-side current collector 100 have a common shape, an appropriate contact pressure can be applied to the single cell C(1) from above and underneath; further, there is improved the performance of the interconnectors 5(1) and 5(2) following deformation of the single cell C(1).

Figure 14:
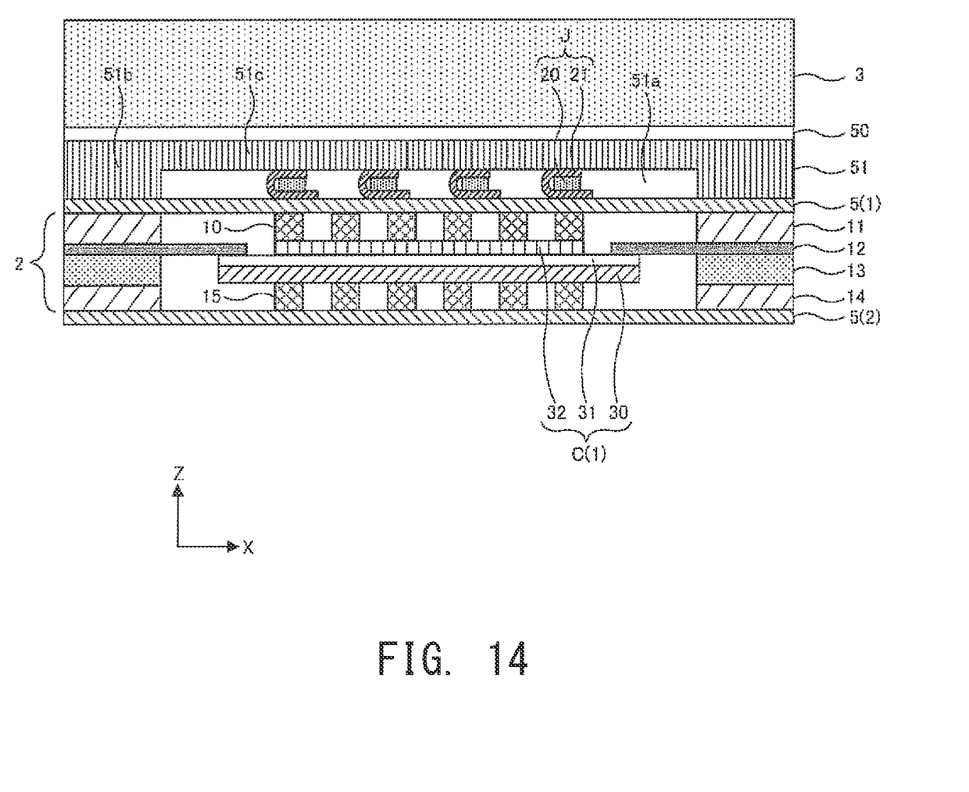
FIG. 14 View showing another modified basic structure of FIG. 2 in the fuel cell stack 1 of the present embodiment.

Further, FIG. 14 is a view showing another modified basic structure of FIG. 2 in the fuel cell stack 1 of the present embodiment. In FIG. 14, in contrast to FIG. 2, the end plate 3 has no cavity having a quadrangular shape in plan view and formed in a lower central region thereof. In FIG. 14, an insulation plate 50 and a terminal plate 51 are disposed, sequentially from the end plate 3 side, between the end plate 3 and the interconnector 5(1). In the modified example shown in FIG. 14, the terminal plate 51 has a cavity having a quadrangular shape in plan view and formed in a lower central region thereof. That is, the terminal plate 51 is formed such that an outer peripheral portion 51b is greater in thickness than a central portion 51c. The interconnector 5(1) having the form of a flat plate is disposed under the terminal plate 51. Thus, the cavity of the terminal plate 51 is closed from underneath by the interconnector 5(1), thereby forming a space 51a. In the modified example of FIG. 14, the end plate 3, the insulation plate 50, and the terminal plate 51 collectively form the first end member of the present invention. Other structural features are similar to those of the basic structure of FIG. 2. Needless to say, the modified basic structure shown in FIG. 14 also yields effects of the present invention.

Figure 15:
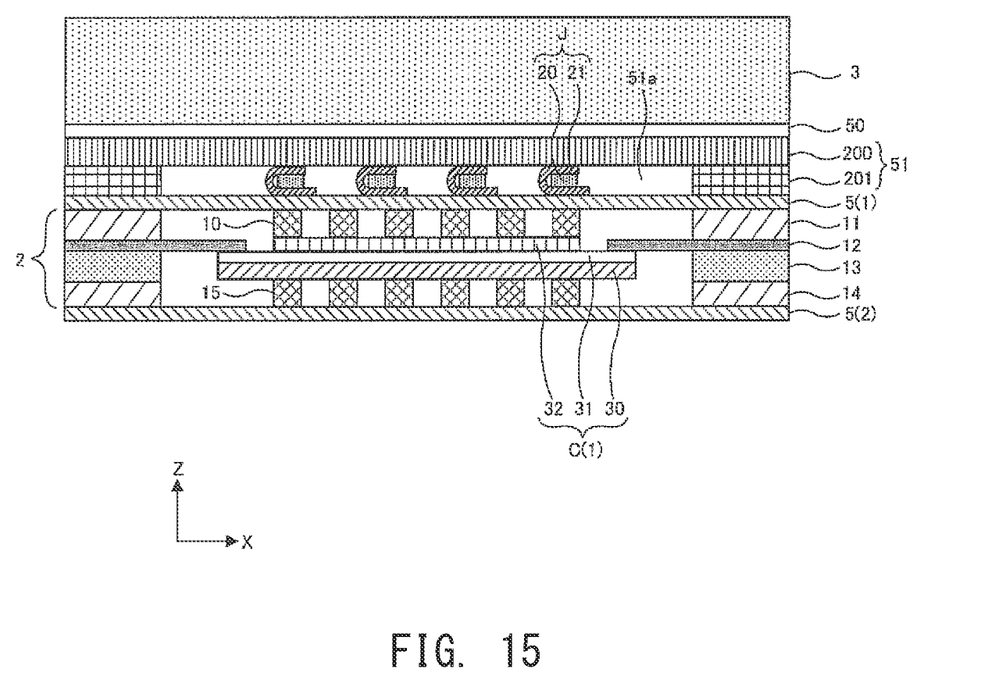
FIG. 15 View showing a modified structure of a terminal plate 51 of FIG. 14.

Meanwhile, FIG. 15 shows a modified structure of the terminal plate 51 of FIG. 14. The modified terminal plate 51 of FIG. 15 has a structure in which a plate member 200 having the form of a flat plate, and a frame member 201 having a central opening are joined together. Specifically, the opening of the frame member 201 forms the space 51a in a condition in which the frame member 201 is held between the plate member 200 and the interconnector 5(1), and the junction member J similar to that of FIG. 2 is disposed in the space 51a. Since the plate member 200 and the frame member 201 are simple in structure as compared with the terminal plate 51 of FIG. 14, working is easy. In this manner, the terminal plate 51 shown in FIG. 14 is not limited to a single member, but may be formed by use of a plurality of members.

While the present invention has been specifically described with reference to the present embodiment, the present invention is not limited thereto, but may be modified in various other forms without departing from the gist of the invention. For example, in the present embodiment, the junction member J is disposed only in the space 3a of the one end plate 3 in the Z-axis direction; however, the opposite end plates 3 and 4 in the Z-axis direction may have the same structure and be disposed symmetrically, and the junction members J may be disposed in the end plates 3 and 4, respectively. Also, as to other features, the present invention is not limited by the above embodiment, and the above embodiment may be modified freely without being limited to the details disclosed in the above embodiment, so long as a modified embodiment yields the action and effects of the present invention.

DESCRIPTION OF REFERENCE NUMERALS

1: solid oxide fuel cell stack; 2: electricity generation unit; 3, 4: end plate; 5: interconnector; 10: cathode-side current collector; 11: cathode-side insulation frame; 12: separator; 13: anode-side frame; 14: insulation frame; 15, 100: anode-side current collector; 20, 60a, 60b, 70a, 70b, 80, 101: elastic member; 21, 61, 71, 81, 102: electrically conductive member; 30: anode layer; 31: solid electrolyte layer; 32: cathode layer; 41: spring member; 50: insulation plate; 51: terminal plate; C: single cell; B1 to B8: bolt; J: junction member; H: through hole; and N: nut.

The invention claimed is:

1. A method of manufacturing a solid oxide fuel cell stack, the method comprising,
   alternately disposing a plurality of single fuel cells, each having an anode layer, a cathode layer, and a solid electrolyte layer, and a plurality of interconnectors are disposed alternately and holding the alternately disposed plurality of single fuel cells and plurality of interconnectors between a pair of end members in a direction in which the plurality of single fuel cells face one another,
   forming a space between a first end member and a first interconnector;
   disposing a junction member composed of an elastic member and an electrically conductive member in the space;
   with respect to the direction in which the plurality of single fuel cells face one another, disposing a portion of the electrically conductive member between the first end member and the elastic member to be in contact with at least the first end member, and disposing another portion of the electrically conductive member between the first interconnector and the elastic member to be in contact with at least the first interconnector;
   electrically connecting the first end member and the first interconnector through the electrically conductive member;
   wherein in a stacking direction, a second interconnector, the single fuel cell, the first interconnector, the junction member, and the first end member are disposed in order, and one and only one single fuel cell is disposed between the second interconnector and the first end member; and
   urging the portion of the electrically conductive member and the another portion of the electrically member against the first end member and the first interconnector so that a total thickness of the portion of the electrically conductive member, the another portion of the electrically conductive member, and the elastic member prior to being disposed in the space between the first end member and the first interconnector is greater than a height of the space.

2. The method according to claim 1, wherein
   the junction member has a unit structure including a bent plate portion of the electrically conductive member; and
   the method further comprises
   disposing one end of the bent plate portion between the first end member and at least a portion of the elastic member in the unit structure, and disposing the other end of the bent plate portion between the first interconnector and at least a portion of the elastic member in the unit structure.

3. The method according to claim 1, wherein
   the junction member has a unit structure including a bent plate portion of the electrically conductive member; and
   the method further comprises
   disposing one end of the bent plate portion between the first end member and at least a portion of the elastic member of the unit structure, and disposing the other end of the bent plate portion between the first interconnector and at least a portion of the elastic member of another unit structure of the junction member.

4. The method according to claim 1, wherein the elastic member is formed of an electrically insulative material, and the electrically conductive member is formed of a metal material.

5. The method according to claim 4, wherein the elastic member is formed of mica.

6. The method according to claim 4, wherein the electrically conductive member is formed primarily of nickel.

7. The method according to claim 1, further comprising filling the space with reducing gas.

8. The method according to claim 1 further comprising
   disposing the second interconnector in opposition to the first interconnector with the single fuel cell intervening therebetween; and
   forming a second space between the single fuel cell and the second interconnector, and disposing a current collector in the second space, the current collector being composed of a second elastic member and a second electrically conductive member and formed such that a portion of the second electrically conductive member is disposed between the single fuel cell and the second elastic member, while another portion of the second electrically conductive member is disposed between the second interconnector and the second elastic member.

* * * * *